(12) United States Patent
Yoshida et al.

(10) Patent No.: US 6,288,211 B1
(45) Date of Patent: Sep. 11, 2001

(54) METHOD OF BREAKING FOAM GENERATED FROM PVC PASTE RESIN LATEX

(75) Inventors: Tsuyoshi Yoshida; Tsukasa Makino; Toshihiko Kimura, all of Hyogo-ken (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/656,761

(22) Filed: Sep. 7, 2000

(30) Foreign Application Priority Data

Sep. 14, 1999 (JP) .................................................. 11-260467

(51) Int. Cl.⁷ ............................... C08F 6/16; C08F 14/06
(52) U.S. Cl. ........................ 528/501; 526/344.2; 528/500
(58) Field of Search ..................................... 528/501, 500; 526/344.2

(56) References Cited

U.S. PATENT DOCUMENTS 4,233,437 * 11/1980 Kalka et al. ........................ 528/501
4,367,331 * 1/1983 Hager et al. ......................... 528/501
6,034,209 * 3/2000 Takeyama et al. .................. 528/501

FOREIGN PATENT DOCUMENTS 53-37059    10/1978   (JP) .

* cited by examiner

*Primary Examiner*—Morton Foelak
(74) *Attorney, Agent, or Firm*—Arent Fox Kintner Plotkin & Kahn PLLC

(57) ABSTRACT

As a method of vacuum recovery of residual monomers from PVC paste resin latex by heating the latex, the present invention is capable of breaking foam derived from foamable PVC paste resin latex after polymerization by utilizing the methods: using a residual monomer vacuum recovery apparatus having a foam separator and transferring the foam which overflows from the vacuum recovery vessel to the foam separator so that the foam makes direct contact with steam causing a breakdown of the foam. This is done without reducing operability, without lowering stable operation, without degrading product quality, and without reducing the solid concentration of the latex.

12 Claims, 2 Drawing Sheets

(COMPARATIVE EXAMPLE)

METHOD OF BREAKING FOAM GENERATED FROM PVC PASTE RESIN LATEX

BACKGROUND OF THE INVENTION

1. Field of the Invention

The present invention relates to a method of breaking foam generated from polyvinylchloride (hereinafter referred to as PVC) paste resin latex. In further detail, the present invention relates to a method of breaking foams which is produced during the vacuum stripping process of residual monomers from foamable PVC paste resin latex after polymerization.

2. Prior Art

PVC paste resin latex has been used for making plastisol by dispersing the PVC paste resin in a plasticizer and heat gelating the plastisol to fabricate goods such as wall paper, floor coverings and gloves. PVC paste resin latex is manufactured by several methods such as a micro-suspension polymerization process, an emulsion polymerization process, or a seeds-emulsion polymerization process in which vinyl chloride monomers or a mixture of vinyl chloride monomers and comonomers polymerizable therewith are polymerized usually using an anionic or cationic surface active agent. The PVC paste resin latex comprises polymers having a particle size of 0.1 to 10 µm and is subjected to spray drying. However, the PVC paste resin latex contains a great deal of residual monomer. Therefore, it is necessary to remove such residual monomer from the latex for the sake of recycling. Moreover, it is necessary to lower the monomer contents in the latex before drying for the sake of reducing vinyl chloride monomers being emitted to the environment.

Generally, as a method of removing residual monomers from PVC resin aqueous liquid, there is disclosed a method of applying steam to the slurry after polymerization under vacuum in Published Examined Japanese Patent Application No. Toku-Kou-Sho 53(1978)-38187 and a method of passing the slurry through perforated trays to contact with a countercurrent flow of steam in a multi-column stripping tower, the steam being introduced to the bottom of the tower, in Published Unexamined Japanese Patent Application No. Toku-Kai-Sho 54(1979)-8693.

There is also a method of recovering residual monomers batch-wisely under vacuum pressure by transferring the PVC resin aqueous liquid into a pressure vessel like a tank and raising the temperature to the extent that the slurry can maintain its stability.

These methods of steam blowing therein or vacuum recovery by heating have problems in that the PVC paste resin latex produces foam, and the foam flies into the vacuum pump line, resulting in the failure of or troubles with the equipment when the latex contains a great deal of a surface-active agent, which makes stable and continuous operation difficult.

Therefore, there existed a defect in that the time for recovery of the residual monomer increased because the treated quantity was reduced and the gas evacuation velocity was lowered in order to control such foaming. The PVC resin aqueous liquids of the present invention means the slurry or latex after polymerizing vinyl chloride monomers by a method of suspension polymerization, micro-suspension polymerization or emulsion polymerization.

As a method of breaking foam from the above-mentioned foamed PVC paste resin latex, there have been proposals of a method of adding proper antifoaming agents and a method of mechanical breaking of foam. However, it has been impossible to control foaming by the method of adding anti-foaming agents to the PVC paste resin latex, since such anti-foaming agents can only be used in a small amount because due to the problem of deteriorating product quality such as heat-stability. Moreover, the method of mechanical breaking of foam sometimes causes degradation of product quality due to breakage of the latex by collision and shearing.

There is proposed another effective method of breaking foam as disclosed in Japanese Patent Application No. Toku-Gan-Hei 11(1999)-12656, wherein foam generated from the latex is broken by passing the latex through the space of the vacuum recovery device or cooling portion in an evacuation pipe. However, in the case that a steam blowing method is employed as the vacuum recovery method, there is a problem that the steam is condensed at a cooling portion resulting in the reduction of the solid concentration of the latex and in low productivity of the spray drying machine in the after-treatment process.

OBJECTS OF THE INVENTION

The present invention was made in view of the aforementioned problems in the art. It is an object, then, of the present invention to provide with a method of breaking the foam generated in the method of stripping the residual monomer from foamable PVC paste resin latex after polymerization by blowing steam into the latex or heating the latex without reducing the operability of the plant, without lowering stable operation, without deteriorating the product quality, and without reduction of the solid concentration of the latex.

SUMMARY OF THE INVENTION

In a method of vacuum recovery of residual monomers from PVC paste resin latex by blowing steam into the latex or by heating the same, the improvement comprises: (1) using residual monomer vacuum recovery device having a foam separator, (2) making the foam overflowing into the foam separator contact directly with the steam.

THE DRAWINGS

Figure 1:
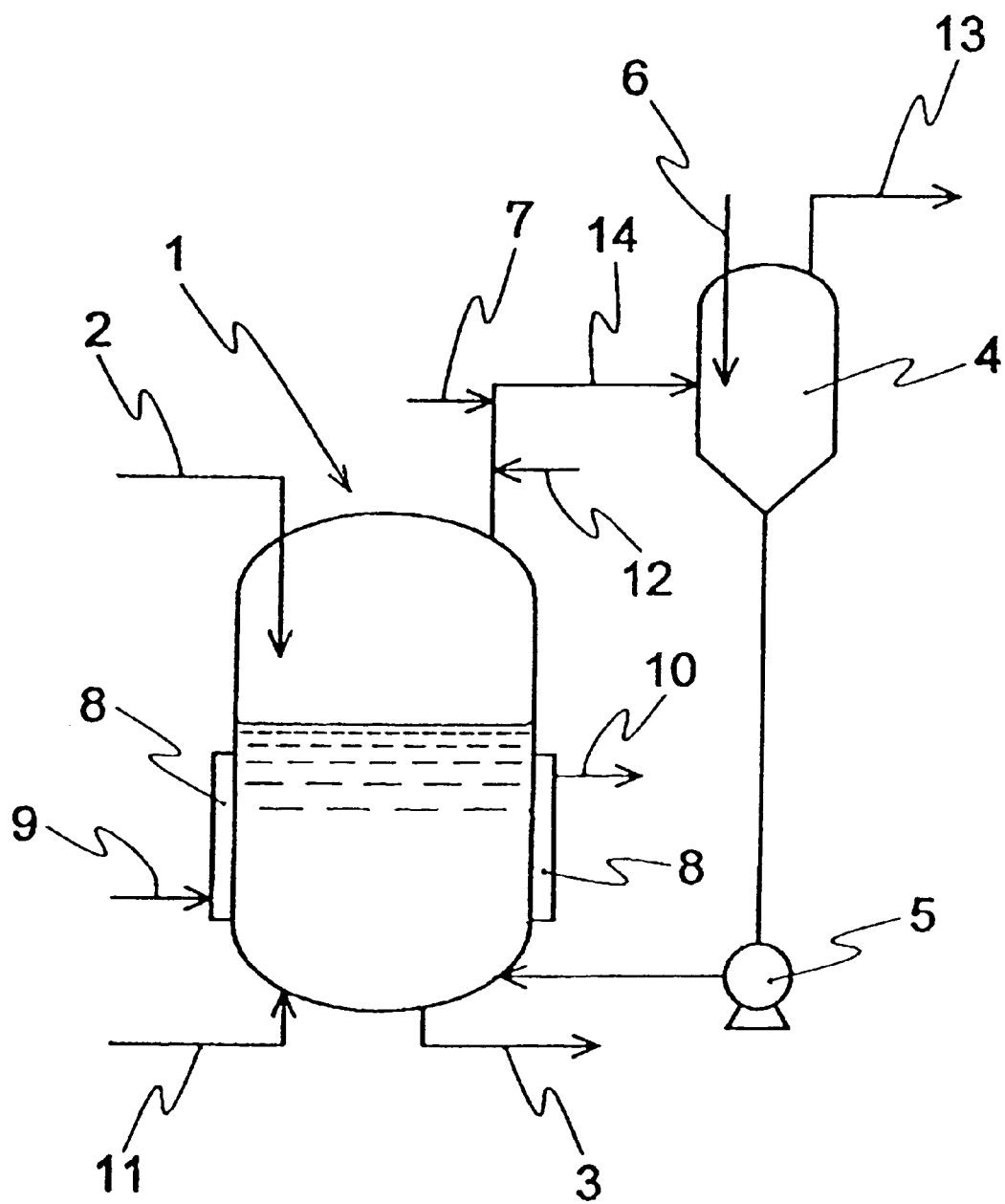
FIG. 1 depicts a schematic representation of an example of the residual monomer removing device according to the invention, which can be used for breaking foam from PVC paste resin latex.

1 vacuum recovery vessel
2 treatment liquid supply line
3 treatment liquid discharge line
4 foam separator
5 transfer pump
6 (A) steam injection line (A)
7 (B) steam injection line (B)
8 heating jacket
9, 10 hot water supply and discharge lines connected to the heating jacket
11 steam supply line
12 antifoaming agent supply line
13 vacuum pump connecting line
14 exhaust line 15 cooling apparatus
16 cooling water supply line
17 cooling water discharge line

DESCRIPTION OF THE INVENTION

This invention relates to a method of breaking foam from PVC paste resin latex (hereinafter called "a method of breaking foam"), and the present invention is characterized in that, in a method of vacuum recovery of residual monomers from PVC paste resin latex by blowing steam into the latex or by heating the same, the foam overflowing into the foam separator from the vacuum recovery vessel are allowed to directly contact with the steam.

In the present invention, a conventional method can be used for vacuum recovery of residual monomers, particularly a steam-stripping method under vacuum is preferred because of its superior recovery efficiency. As a vacuum recovery device using steam, machines and equipment which are generally used for the residual monomer recovery in PVC resin manufacturing process can be used, for example, a pressure vessel such as a tank can be used if it is capable of vacuum treatment and of treating the latex at a temperature maintaining its stability.

As a heat recovery method without using steam, one example is a vacuum column recovery method in which the vacuum recovery is carried out by controlling the latex temperature by the heat from the jacket of the column.

In the present invention, it is also possible to apply jacket heating and steaming together in a vacuum recovery method. Further, it is possible to treat the latex continuously by feeding it continuously to the vacuum recovery apparatus. At the time of vacuum recovery, the temperature of the liquid tends to decrease due to evaporation of water at the boundary of the gas phase and the liquid phase. However, in the present invention, the temperature of the liquid can be kept constant by controlling the amount of steam and by the heat from the jacket at the time of the vacuum recovery.

In the above-mentioned apparatus for residual monomer recovery, the vacuum recovery temperature (treatment temperature) may be in the range, preferably not more than 80° C., where the stability of PVC paste resin latex is maintained and coagulation among particles would not occur. When the temperature exceeds 80° C., there is concern that the emulsion of PVC paste resin latex is likely to coagulate, although it depends on the time spent for vacuum recovery (treatment time). The vacuum degree should be preferably identical to the water vapor pressure at the treatment temperature or a little lower than that. There is concern that if the vacuum degree is less than the water vapor pressure at treatment, the recovery rate of the residual monomer will not be high enough, making the treatment time longer and resulting in low productivity.

When removing residual monomers from PVC paste resin latex by means of the above-mentioned vacuum recovery method, foam is generated due to the great deal of surface active agents usually contained in the latex. Said foam is produced by the steam and the vinyl chloride monomer released from the particles in the PVC paste resin latex, and the liquid membranes thereof are made of PVC paste resin latex being kept at a temperature of saturated water vapor pressure corresponding to the ambient operating pressure.

The method for breaking foam of the present invention is characterized in that the steam directly contact the foam overflowing into the foam separator. In order to evaporate the water solvent -forming liquid membrane of the foam, it is preferable for the foam to make direct contact with overheated steam at a higher temperature than the saturated water vapor temperature under the inner operating pressure of foam separator. The overheated steam turns into a saturated steam after being removed from heat and it is then exhausted outside the apparatus, thus avoiding a reduction of the solid concentration of the latex.

There is no limitation in the amount of steam employed in the present invention and the steam may be used in an amount adequate to completely break the foam being produced. Moreover, in the present invention, PVC paste resin latex may be heated by other means instead of steam heating, so far as it is feasible to provide the latex with a thermal energy to keep the temperature at that which the water content of the liquid membrane of the foam partially evaporates. Thus, a heated PVC paste resin latex may be used.

According to the method of the present invention, in order to completely break a large quantitiy of generated foam by making the foam directly contact the steam and by uniformly mixing the produced foam with the steam, it is preferable that the foam directly contacts the steam immediately after overflowing into the separator. Or, the steam may be introduced to contact directly with the foam in a gas recovery line, which connects the vacuum recovery apparatus and the foam separator.

Alternatively, it is possible to introduce steam into the vacuum recovery vessel. However, the contact efficiency is not very good, since a lot of steam is required to spray it over the entire surface of the foam in the vessel. Thus, the former steam contacting method is preferable.

Further, in the present invention, it is also preferable to return the PVC paste resin latex after removing foam in the foam separator to the vacuum recovery vessel by a transfer means like a pump. This is because the temperature of the latex after removal of foam therefrom becomes a little higher than the saturated steam temperature at the vacuum degree in the foam separator due to its contact with steam. Thus there is a fear that the latex in the foam separator will boil again and produce foam when it remains in the foam separator. Therefore, it is preferable to install a means of transferring the latex to the vacuum recovery vessel immediately after removing the foam.

Described below is a concrete explanation of the method of breaking foam from PVC paste resin latex of the present invention with drawing references. In FIG. 1, PVC paste resin latex kept at around the treatment temperature is supplied through treatment liquid supply line 2 from the previous step and is maintained at a constant temperature by heating jacket 8. Saturated steam is introduced from the bottom of vacuum recovery vessel 1 through the steam supply line 11. Vacuum degree in vacuum recovery vessel 1 is controlled so that it is kept constant at a saturated steam pressure under the treatment temperature. Then the residual monomer is recovered through line 13 connecting foam separator 4 and the vacuum pump.

When the supply of the saturated steam is started, a great deal of foaming occurs due to bubbling and thereby foam is discharged into exhaust line 14 after filling the space in the vacuum recovery vessel 1. Then such foam passes through exhaust line 14 and directly contact steam that is injected from stream injection line (A)6, immediately after overflowing into foam separator 4. Then the foam is destroyed due to the evaporation of water in the liquid membrane thereof.

The latex after breaking the foam therefrom in foam separator 4 is transferred to the vacuum recovery apparatus 1 by transfer pump 5 installed on the line from a lower part of the foam separator. After vacuum recovery treatment for a prescribed time period, the latex is transferred to the next step through treatment liquid discharge line 3. In the case that steam is introduced to directly contact the foam in the gas recovery line, which connects the vacuum recovery device and the foam separator, steam injection line (B)7, which is installed on the gas recovery line, is used to introduce steam. In FIG. 1, the residual monomer vacuum recovery device comprises one foam separator 4, however, the residual monomer vacuum recovery device of the present invention may comprise two or more foam separators installed in a series along the gas recovery line. In FIG. 1, line 9 and 10 are hot water lines for jacket-heating and line 12 is an anti-foaming agent addition line.

EXAMPLES

The present invention is further described based on the following examples. However, the present invention is not limited only to these examples.

In the examples and comparative examples, the measurements and evaluations were performed according to the following methods.

(A) Determination of operability of vacuum recovery treatment

Determined by observing the state of dispersing foam into the recovery line through the site glass installed on the vacuum recovery line.

(B) Determination of concentration of the residual monomers in PVC paste resin latex.

The measurement was performed by a known method using gas-chromatograph comprising steps of: (1) measuring PVC paste resin latex corresponding to 2 g of dry-weight of the resin, (2) dissolving it in 40 cc of tetra-hydro-furan by stirring, (3) loading 0.5 cc of the solution in the gas-chromatograph (GC-14A: made by Shimazu Manufacturing Co.Ltd,), and (4) determining concentration of the residual monomer by a hydrogen ion detection method. PVC monomer concentration measured by above method was recalculated in a weight ratio against the solid content of the latex, thus resulting in the residual vinyl chloride monomer concentration in the latex.

Example 1

Vinyl chloride monomers were polymerized in the aqueous medium by a known micro-suspension method. Then the residual monomers were recovered from the polymerization vessel under vacuum, and PVC paste resin latex having 45% by weight of the resin concentration and an average particle size of 1 μm was obtained. The residual monomer concentration in the latex was 4000 ppm.

Subsequently, the PVC paste resin latex thereby obtained was placed in vacuum recovery vessel 1 of FIG. 1 at its capacity of 500 liters. Vessel 1 was kept at 50° C. and the inner pressure was controlled at 92 mmHg while continuously introducing saturated steam of 60° C. from the bottom of vessel 1.

When the foam overflowed in the foam separator 4 with a capacity of 50 liters, overheated saturated steam was supplied thereto through steam injection line(A) 6. After carrying out stripping with the saturated steam for 20 minutes, the residual monomer was recovered.

The defoamed latex from foam separator 4 was transferred to vacuum recovery vessel 1 by transfer pump 5. No foam dispersion to the gas recovery line from the foam separator was found enabling continuous treatment. The preferred residual monomer concentration against solid contents in PVC paste resin latex was 50 ppm. The solid concentration of the latex after treatment was 45% by weight. Thus, no reduction of the solid concentration was found.

Example 2

The vacuum recovery was carried out by the same manner as in example 1, except that the overheated steam was introduced from steam injection line (B)7 installed between vacuum recovery vessel 1 and foam separator 4, instead of supplying the overheated steam from steam injection line (A)6 installed on foam separator 4.

As a result, no dispersion of foam to the gas recovery line from foam separator 4 was found enabling its continuous operation. The preferred residual monomer concentration against solid contents in PVC paste resin latex was 50 ppm. The solid concentration of the latex after the treatment was 45 weight %. Thus, no reduction of the solid content was found.

Example 3

The vacuum recovery was carried out by the same manner as in example 1, except that the inner temperature of vessel 1 was maintained at 50° C. by the use of heating jacket 8, instead of supplying saturated steam from the bottom of vessel 1. As a result, no dispersion of foam to the gas recovery line from the foam separator 4 was found, enabling its continuous operation. The residual monomer concentration against solid content in the PVC paste resin latex was 200 ppm. The solid concentration of the latex after the treatment was 45.5% by weight. Thus, no reduction in the solid concentration occurred.

Comparative Example 1

Vacuum recovery was carried out in the same manner as in example 1, except that the overheated steam was not introduced from steam injection line (A)6 installed on foam separator 4. As a result, the foam overflowed from the foam separator and heavily entrained into the gas recovery line after foam separator 4. Operation was then urged to stop for fear of failure of the vacuum pump.

Comparative Example 2

Vacuum recovery was carried out in the same manner shown in example 1, except that the overheated steam was not introduced from steam injection line (A)6 installed on the foam separator 4, and a silicone antifoaming agent was added. The anti-foaming agent was added from antifoaming agent addition line 12 of FIG. 1 at the ratio of 100 ppm per solid content in the PVC paste resin latex. However, the foam overflowed from the foam separator and heavily entrained into the gas recovery line after foam separator 4. Operation was then urged to stop for fear of failure of the vacuum pump.

Comparative Example 3

Figure 2:
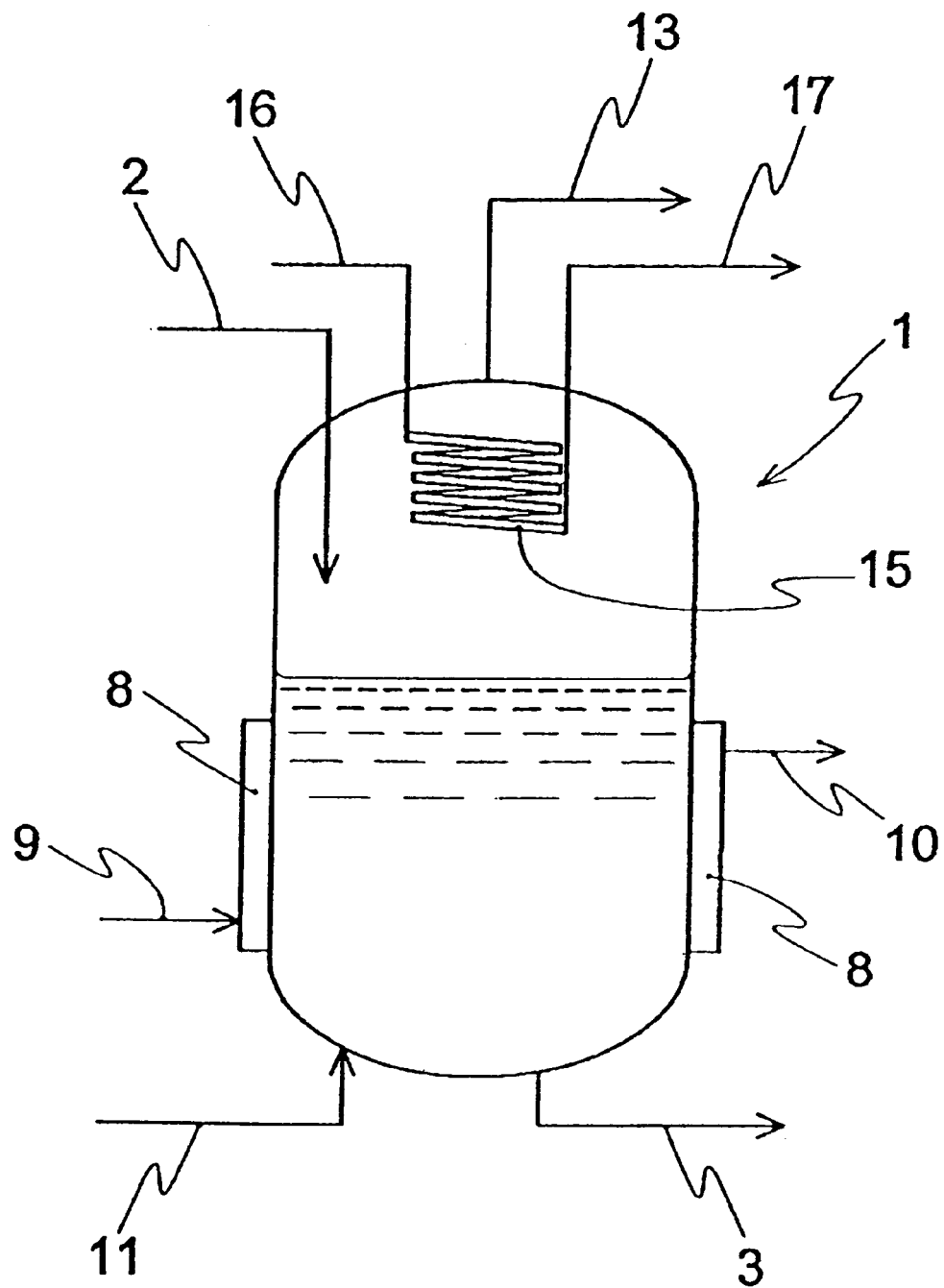
FIG. 2 depicts a schematic representation of an example of the residual monomer removing device equipped with a cooling coil instead of a steam injection line for breaking foam in a foam separator.

Vacuum recovery was carried out in the same manner as example 1, except that the overheated steam was not introduced from steam injection line (A)6 installed on foam separator 4 as shown in FIG. 1, and spiral cooling device 15, as shown in FIG. 2 was employed.

The temperature of the cooling water which was supplied to cooling apparatus 15 was 30° C. FIG. 2 depicts vacuum recovery apparatus 1, treatment liquid feed line 2, treating liquid discharge line 3, heating jacket 8, hot water supply and discharge line 9 (and 10), steam supply line 11, vacuum pump connecting line 13, cooling water supply line 16, and cooling water discharge line 17.

As a result, no dispersion of foam to the gas recovery line from the foam separator 4 was found, enabling its continuous operation. The residual monomer concentration against solid content in PVC paste resin latex was 60 ppm preferably. However, the solid concentration of latex after treatment was 40% by weight. Thus, reduction in the solid concentration was observed.

As described above, in the method of stripping residual monomer from foamable PVC paste resin latex after polymerization by blowing steam into the latex or heating the latex, the present invention can provide a method of breaking foam being generated from PVC paste resin latex during steam stripping, without reducing the operability of the plant, without lowering stable operation, without degrading product quality, and without reducing solid concentration of the latex.

What we claim is:

1. In a method for recovering residual monomer from a PVC paste resin latex by heating the latex under vacuum and using a vacuum recovery apparatus, the improvement which comprises:

(a) introducing the latex to a vacuum recovery vessel of a vacuum recovery apparatus having a foam separator, (b) heating the latex whereby foam is generated in the vacuum recovery vessel, (c) transferring the foam which overflows from the vacuum recovery vessel to the foam separator such that the foam makes direct contact with steam causing a breakdown of the foam, and (d) recovering the resulting residual monomer.

2. The method of claim 1 wherein the heating of the latex is accomplished by introducing saturated steam into the latex and/or by a heating jacket surrounding the vacuum recovery vessel.

3. The method of claim 1 wherein the foam makes immediate contact with the steam as it enters the foam separator.

4. The method of claim 3 wherein the steam to contact with the foam is overheated steam having a temperature higher than the saturated steam temperature at the operating inner pressure of the foam separator.

5. The method of claim 1 wherein the foam passes through a gas recovery line positioned between the vacuum recovery vessel and the foam separator, the foam coming in direct contact with steam while passing through the gas recovery line.

6. The method of claim 1 wherein the PVC paste resin latex, after being separated from the foam in the foam separator, is returned to the vacuum recovery vessel.

7. A method for recovering a residual monomer from a PVC paste resin latex by batch operation which comprises the steps of:

(a) placing the latex in a vacuum recovery vessel, (b) heating the latex in the recovery vessel under vacuum at a treatment temperature of not more than 80°C to strip the residual monomer from the latex, (c) passing foam, which is generated in the recovery vessel during said heating and overflows from the vacuum recovery vessel, to a foam separator through an exhaust line which connects the vacuum recovery vessel and the foam separator, (d) bringing the overflowing foam into direct contact with steam, thereby breaking the foam, (e) recovering the residual monomer, and (f) withdrawing the treated latex from the vacuum recovery vessel.

8. The method of claim 7, wherein said heating of the latex in step (b) is conducted by introducing steam into the latex placed in the vacuum recovery vessel.

9. The method of claim 7, wherein said heating of the latex in step (b) is conducted by jacket heating method.

10. The method of claim 7, wherein said heating of the latex in step (b) is conducted by combination of jacket heating and steam blowing into the vacuum recovery vessel.

11. The method of claim 7, wherein said overflowing foam is brought into direct contact with steam introduced into said exhaust line.

12. The method of claim 7, wherein a latex resulting from breaking of the foam by the direct contact with steam is returned from the foam separator to the vacuum recovery vessel.

* * * * *